United States Patent
Trone et al.

(10) Patent No.: US 10,322,760 B2
(45) Date of Patent: Jun. 18, 2019

(54) UNDERCARRIAGE CLAMPING MASTER TRACK LINK

(71) Applicant: Caterpillar Inc., Peoria, IL (US)

(72) Inventors: Matthew William Trone, Pekin, IL (US); Roger L. Recker, Dunlap, IL (US); Eric James Johannsen, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 159 days.

(21) Appl. No.: 15/473,863

(22) Filed: Mar. 30, 2017

(65) Prior Publication Data

US 2018/0281880 A1 Oct. 4, 2018

(51) Int. Cl.
*B62D 55/21* (2006.01)
*B62D 55/28* (2006.01)
*B62D 55/06* (2006.01)

(52) U.S. Cl.
CPC .......... *B62D 55/213* (2013.01); *B62D 55/21* (2013.01); *B62D 55/28* (2013.01); *B62D 55/06* (2013.01)

(58) Field of Classification Search
CPC ......... B62D 55/23; B62D 55/21; B62D 55/06
USPC ................ 305/185, 186, 187, 190, 195, 196
See application file for complete search history.

(56) References Cited

U.S. PATENT DOCUMENTS

| 3,717,389 | A | 2/1973 | Boggs et al. | |
| 6,783,196 | B2 | 8/2004 | Maguire et al. | |
| 7,877,977 | B2* | 2/2011 | Johannsen | B62D 55/213 |
| | | | | 305/186 |
| 8,985,590 | B2* | 3/2015 | Liang | B62D 55/211 |
| | | | | 277/549 |
| 2003/0141760 | A1* | 7/2003 | Yamamoto | B62D 55/211 |
| | | | | 305/185 |
| 2012/0153715 | A1* | 6/2012 | Tsubaki | B62D 55/092 |
| | | | | 305/186 |

FOREIGN PATENT DOCUMENTS

| EP | 1391371 | 2/2004 |
| JP | S4730335 | 12/1972 |
| JP | 2008018795 | 1/2008 |

* cited by examiner

*Primary Examiner* — S. Joseph Morano
*Assistant Examiner* — Jean W Charleston
(74) *Attorney, Agent, or Firm* — Law Office of Kurt J. Fugman LLC

(57) ABSTRACT

A clamping master track link comprises a body that defines a first bore and a second bore, a first aperture disposed between the first bore and the second bore, a second aperture disposed between the first aperture and the second bore, a first strut with a first gap disposed between the first aperture and the second aperture, a second strut with a second gap disposed between the first aperture and the first bore, and a bridge disposed between the second aperture and the second bore.

16 Claims, 8 Drawing Sheets

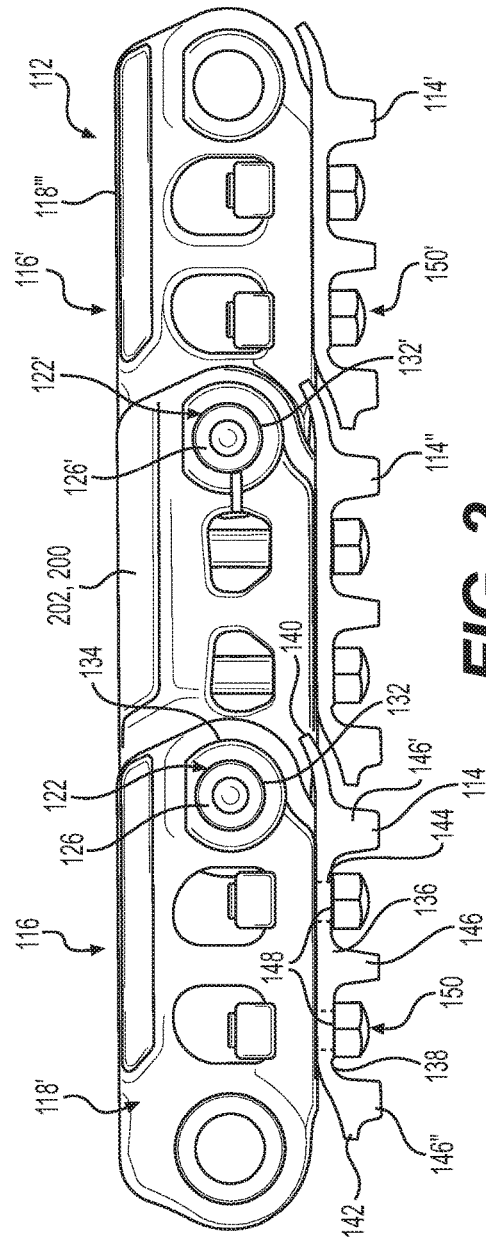

UNDERCARRIAGE CLAMPING MASTER TRACK LINK

TECHNICAL FIELD

The present disclosure relates to a method and apparatus for machining a master track link used for completing a track chain assembly of an endless undercarriage drive employed by earth moving, construction and mining equipment and the like. Specifically, the present disclosure relates to a clamping master track link has one or more struts each divided by a gap.

BACKGROUND

Earth moving, construction and mining equipment and the like work are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, a device is typically provided that allows the track chain to be routed about the drive sprocket, idler and support rollers before the free ends of the chain are joined together. This device is called a "master link".

Also, depending on the weight of the machine, the size of the chain, the environment in which the machine operates, and other factors, the chains and/or track shoes may wear or be damaged and may require periodic inspection, servicing, repair, and/or replacement. Hence, a master link may also be provided in the chain to allow disassembly of the chain (i.e., separation of two ends of the chain).

As can be imagined, it is desirable for master track links to have at least three traits. First, it is desirable that the master track links be reliable or durable. That is to say, the master track link should not be prone to unintentional disassembly when a track chain is in use. If this happens, the track chain assembly may fall off the undercarriage of the machine, leading to unwanted downtime and maintenance of the machine to get the machine up and running again. Second, it is desirable that the master track link be able to be easily serviceable. That is to say, it should not be time consuming to detach the master track link so that maintenance as described above can be performed. Third, it is desirable to be able to cost effectively manufacture the master track link.

Some master track link designs in current use a pin that is press fit into the master track link while others use a pin that is slip fit and held into place using a cotter pin. The press fit provides a low cost, robust design in terms of reliability or durability but is not easily serviced. On the other hand, the slip fit pin is higher cost but provides a robust design in terms of serviceability, however, it is less desirable in terms of durability or reliability. If the cotter pin falls out, the master track link will often fall off the pin.

Accordingly, a need exists for a method and apparatus related to a master track link that can provide a better combination of serviceability, durability or reliability and cost.

One prior master track link using a clamping method to hold onto pins is disclosed in U.S. Pat. No. 7,877,977 to Johannsen et al. The '977 patent suggests providing a clamping master track link that is configured to clamp on bushing/pin combinations on both ends of the master track link (see FIGS. 4 and 5 of the '977 patent). Furthermore, it discloses a straight link where the holes configured to clamp on the bushing/pin combinations are in the same plane. However, this is incompatible with many track chain assembly designs already in the field. Also, this master track link design uses three small gaps between the struts, which require expensive machines such as grinding or wire EDM to manufacture the track link. Therefore, a master track link that is less costly, more durable or reliable, and more serviceable and that can be retrofitted with track chain assemblies already in the field is still warranted.

SUMMARY

A clamping master track link is provided according to an embodiment of the present disclosure and comprises a body that defines a first bore and a second bore, a first aperture disposed between the first bore and the second bore, a second aperture disposed between the first aperture and the second bore, a first strut with a first gap disposed between the first aperture and the second aperture, a second strut with a second gap disposed between the first aperture and the first bore, and a bridge disposed between the second aperture and the second bore.

A clamping master track link is provided according to an embodiment of the present disclosure and comprises a body defining a top surface, a bottom surface, a first side surface and a second side surface defining a thickness therebetween, a proximate end and a distal end. The body also defines a first bore adjacent the distal end and a second bore adjacent to the proximate end, a first aperture disposed between the first bore and the second bore, the first aperture being disposed nearer the first bore than the second bore, a second aperture disposed between the first aperture and the second bore, a first strut disposed between the first aperture and the second aperture, the body defining a first gap dividing the first strut into a first upper portion and a first lower portion, and a second strut disposed between the first aperture and the first bore, the body defining a second gap dividing the second strut into a second upper portion and a second lower portion. The first gap defines a first minimum distance and the second gap defines a second minimum distance and the ratio of the second minimum distance to the first minimum distance ranges from 3 to 10.

A track chain assembly is provided according to an embodiment of the present disclosure and comprises a plurality of track pins and track bushings disposed about the track pins, and a plurality of track links that are connected to each other by either a track pin or a track bushing, wherein at least one track link defines a plurality of apertures for receiving a track pin or bushing. The chain assembly may also include a plurality of track fasteners, a plurality of track shoes attached to the track links via the track fasteners; and at least one clamping master track link including a body defining a top surface, a bottom surface, a first side surface and a second side surface defining a thickness therebetween, a proximate end and a distal end. The body may define a first bore adjacent the distal end and a second bore adjacent to the proximate end, a first aperture disposed between the first bore and the second bore, the first aperture being disposed nearer the first bore than the second bore, a second aperture disposed between the first aperture and the second bore, a first strut disposed between the first aperture and the second aperture, the body defining a first gap dividing the first strut into a first upper portion and a first lower portion, a second strut disposed between the first aperture and the first bore, the body defining a second gap dividing the second strut into a second upper portion and a second lower portion. The first bore may define a first longitudinal axis and the second bore may define a second longitudinal axis and the body jogs, forming an offset master track link such that the first bore and second bore are offset from each other along either the first or second longitudinal axis. The first bore may define a first diameter, the second bore may define a second diameter, the first diameter may be less than the second diameter, and the first bore is a blind bore and the second bore is a thru bore, and the body includes a bridge disposed between the second aperture and the second bore.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 2 is a side-view of a track chain assembly of the machine of FIG. 1 removed from the machine.

FIG. 3 is a top-view illustration of the track chain assembly of FIG. 2.

DETAILED DESCRIPTION

Figure 1:
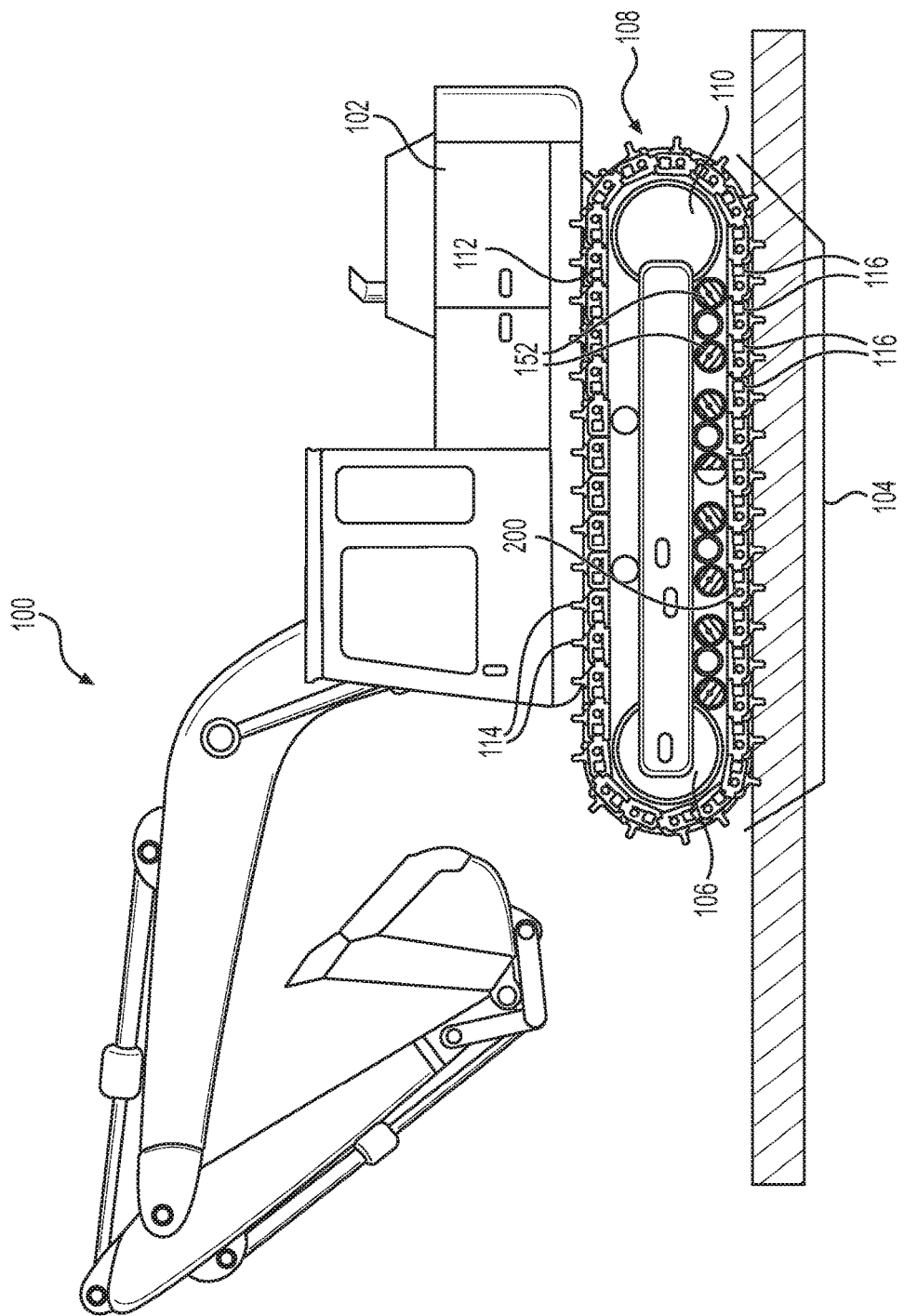
FIG. 1 is a side-view of a machine that may use various track chain assemblies with a clamping master track link according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a clamping master track link will now be described. In some embodiments, the clamping master track link is an offset link that may be used with track chain assemblies already in the field.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known in the art.

Undercarriage assembly 104 may include two separate continuous tracks 108, one on either side of machine 100 (only one of which is shown in FIG. 1). Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116 and a master link subassembly 200. Support rollers 152 are also provided at the bottom of the track to support the chain.

Figure 8:
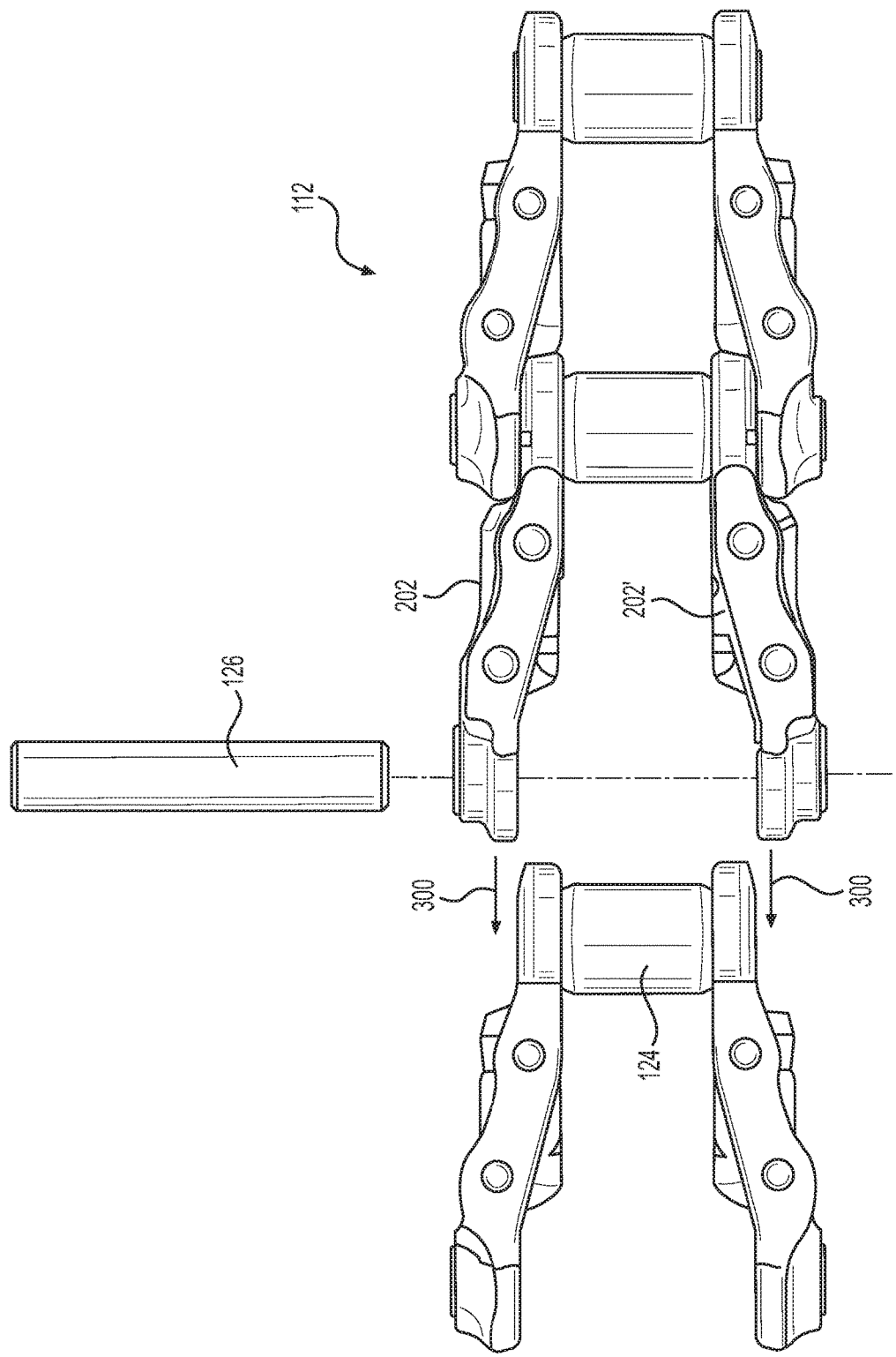
FIG. 8 is a top oriented perspective view of a track chain assembly according to various embodiments of the present disclosure showing the free ends of the chain as they approach the free ends of the opposing clamping master track link while completing the assembly of the track chain assembly.
Figure 9:
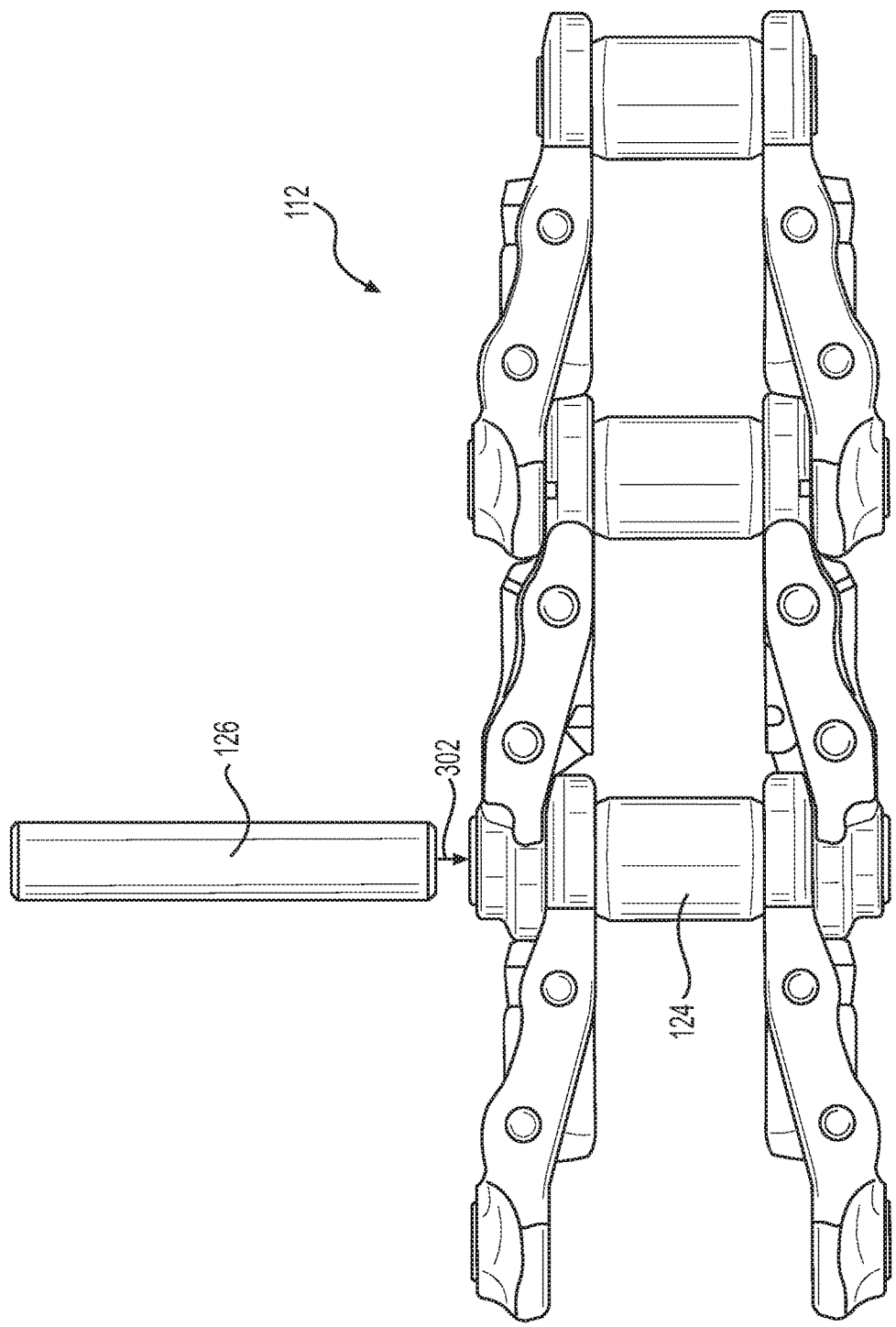
FIG. 9 is a top oriented perspective view of a track chain assembly of FIG. 8 showing the mating of the free ends of the opposing clamping master track links before the final pin is inserted into the bores of the links and the bore of the bushing and before the shoe is attached to the clamping master track links, completing assembly of the track chain assembly by causing the impingement of the clamping master track links onto the final pin.

FIGS. 2 and 3 respectively illustrate side-view and top-view perspectives of an exemplary chain assembly 112 and, specifically, a plurality of exemplary link subassemblies 116 and a master link subassembly 200. Each one of link subassemblies 116 may include a respective pair of offset link members 118 or a respective pair of inner and outer links when straight links are used (not shown). Each offset link member 118 may include fastener holes 120, e.g., a threaded hole, configured to receive a fastener 150, e.g., a bolt, or cap screw, to attach a track shoe 114 to a given one of link subassemblies 116. Master track link assembly 200 may include a clamping master track link 202. The master track link subassembly may be used to complete the chains assembly 112 in a manner that will be further described below with reference to FIGS. 8 and 9 later herein.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown) that are freely rotatable relative to pin 126, and a pair of seals (not shown) may also be provided in the rod assembly or in one of the link members proximate the rod assembly to prevent the loss of lubrication and provide freedom of movement. In some embodiments, the bearings and seals may be combined functionally in the same assembly. The bushing 124 may be pressed into an aperture 128 of one end 130 of the offset link member 118 and the pin 126 may extend through this end 130 of the offset link member 118 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. Of course, a plurality of offset link members 118 are connected in a manner similar to what has just been described to form the track chain assembly 112.

More particularly, the first and second rod assemblies 122 may interface with apertures 128, 132 of adjacent offset link members 118, 118' such that consecutively connected link subassemblies 116 may be pivotally interconnected to one another to form the track chain assembly 112. For example, the outer end 134 of one offset link member 118' may mate in fixed manner with the pin 126 (such as when a press fit is employed) and house the seals and/or bearings assemblies while the inner end 130 of the adjacent offset link member 118 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118 may be configured to pivot with respect to one another to form an articulating track chain assembly 112. Similarly, master track link subassembly 200 may be interconnected between two standard link subassemblies 116 by way of rod assemblies 122.

A track shoe 114 may be connected to each offset link member 118. Each track shoe 114 may include a base portion 136, a ground-engaging surface 138, a leading edge 140, and a trailing edge 142. Each track shoe 114 may also include opposing side edges 144 (only one of which shown in FIG. 2) disposed between leading edge 140 and trailing edge 142. One or more grousers or ribs 146 may be provided to engage the ground, improving traction. Additionally, each track shoe 114 may also include two pairs of threaded shoe holes 148, each pair disposed along a respective one of the side edges 144 and configured to align with a pair of fastener holes 120 associated with an offset link member 118. In some embodiments, holes 148 may be clearance holes and not be threaded.

Typically, each one of shoe holes 148 may correspond to an associated fastener receiving hole 120 situated on the bottom surface of each of the offset link members 118. As such, each track shoe 114 may respectively connect to a pair of opposing pair of offset link members 118 from one side of the track chain assembly to the other side of the track chain assembly shown in FIG. 3. Threaded fasteners 150, such as, for example, bolts or cap screws, may be respectively disposed in each one of shoe holes 148 and fastener receiving holes 120 to fasten a track shoe 114 to a respective pair of opposing offset link members 118. It is contemplated that the spacing of the fastener receiving holes 120 for each offset link member 118 may be substantially similar such that each track shoe 114 may be configured to be connectable to each of offset link members 118, assuming that each track shoe is also similarly or identically configured.

Turning now to FIGS. 4 thru 7, master track link subassemblies 200 according to various embodiments of the present disclosure are depicted. A master track link subassembly 200 may comprise a clamping master track link 202 that includes a body 204 defining a top surface 206, a bottom surface 208, a first side surface 210 and a second side surface 212 defining a thickness therebetween, a proximate end 214 and a distal end 216. The body 204 may also define a first bore 218 adjacent the distal end 216 and a second bore 220 adjacent to the proximate end 214. These bores 218, 220 may extend from or be at least partially defined by either or both side surfaces 210, 212. As shown, the bores are cylindrical but may have another suitable configuration.

Furthermore, the body 204 may further define a first aperture 222 disposed between the first bore 218 and the second bore 220, the first aperture 222 being disposed nearer the first bore 218 than the second bore 220. Similarly, the body 204 may further define a second aperture 224 disposed between the first aperture 222 and the second bore 220. These apertures extend from the first side surface 210 completely through the body 204 to the second side surface.

As a result of the placement of these bores 218, 220 and apertures 222, 224, the body 204 includes a first strut 226 disposed between the first aperture 222 and the second aperture 224. Also, the body 204 defines a first gap 228 dividing the first strut 226 into a first upper portion 230 and a first lower portion 232. Likewise, the body 204 includes a second strut 234 disposed between the first aperture 222 and the first bore 218, the body 204 defining a second gap 236 dividing the second strut 234 into a second upper portion 238 and a second lower portion 240. Both gaps 228, 236 extend completely through the body 204 from the first side surface 210 to the second side surface 212, providing the necessary flexibility for the clamping master track link 202 as will be described later herein. The body 204 includes a bridge 246 disposed between the second aperture 224 and the second bore 220. This bridge 246, which may also be referred to as a unitary or undivided strut, provides the requisite rigidity near the second bore of the clamping master track link 202 as will also be explained later herein.

For the embodiments shown in FIGS. 4 thru 7, the clamping master track link 202 is an offset link, similar to the standard offset links described above with reference to FIGS. 2 and 3. That is to say, the proximate end 214 is offset from the distal end 216 in a direction that is parallel to the longitudinal axis L126 of the pins 126 and bushings 124 of the track chain assembly 112 as best seen in FIG. 3. Returning to FIGS. 4 and 5, the clamping master track link 202 may be described as follows. The first bore 218 defines a first longitudinal axis L218 and the second bore 220 defines a second longitudinal axis L220 and the body 204 jogs, forming an offset master track link such that the first bore 218 and second bore 220 are offset or spaced away from each other along either the first or second longitudinal axis L218, L220. Other configurations are possible for the clamping master track link including a straight link configuration, etc.

Figure 4:
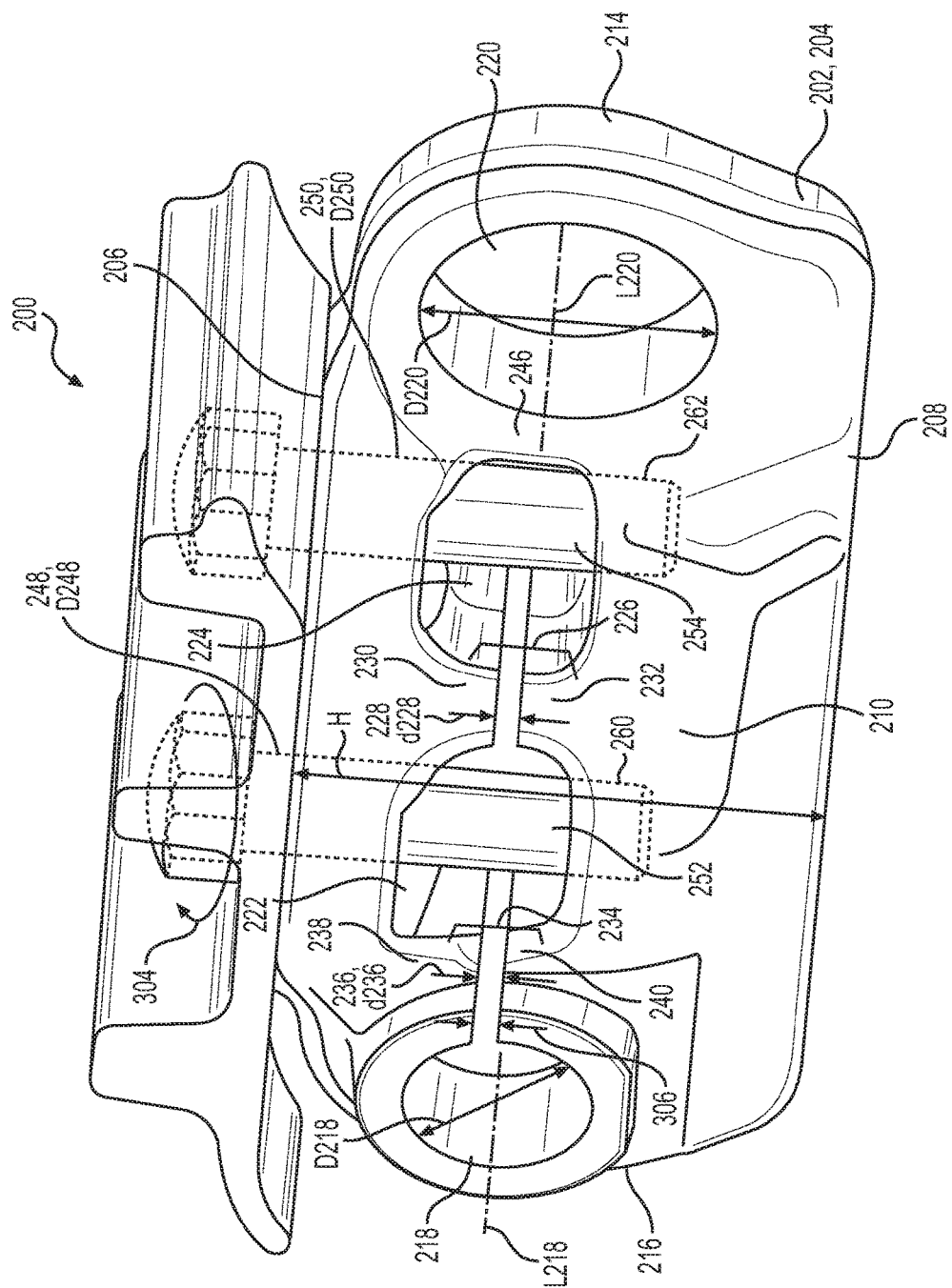
FIG. 4 is a front oriented perspective view of an exemplary clamping master track link subassembly of the track chain assembly of FIG. 2.
Figure 5:
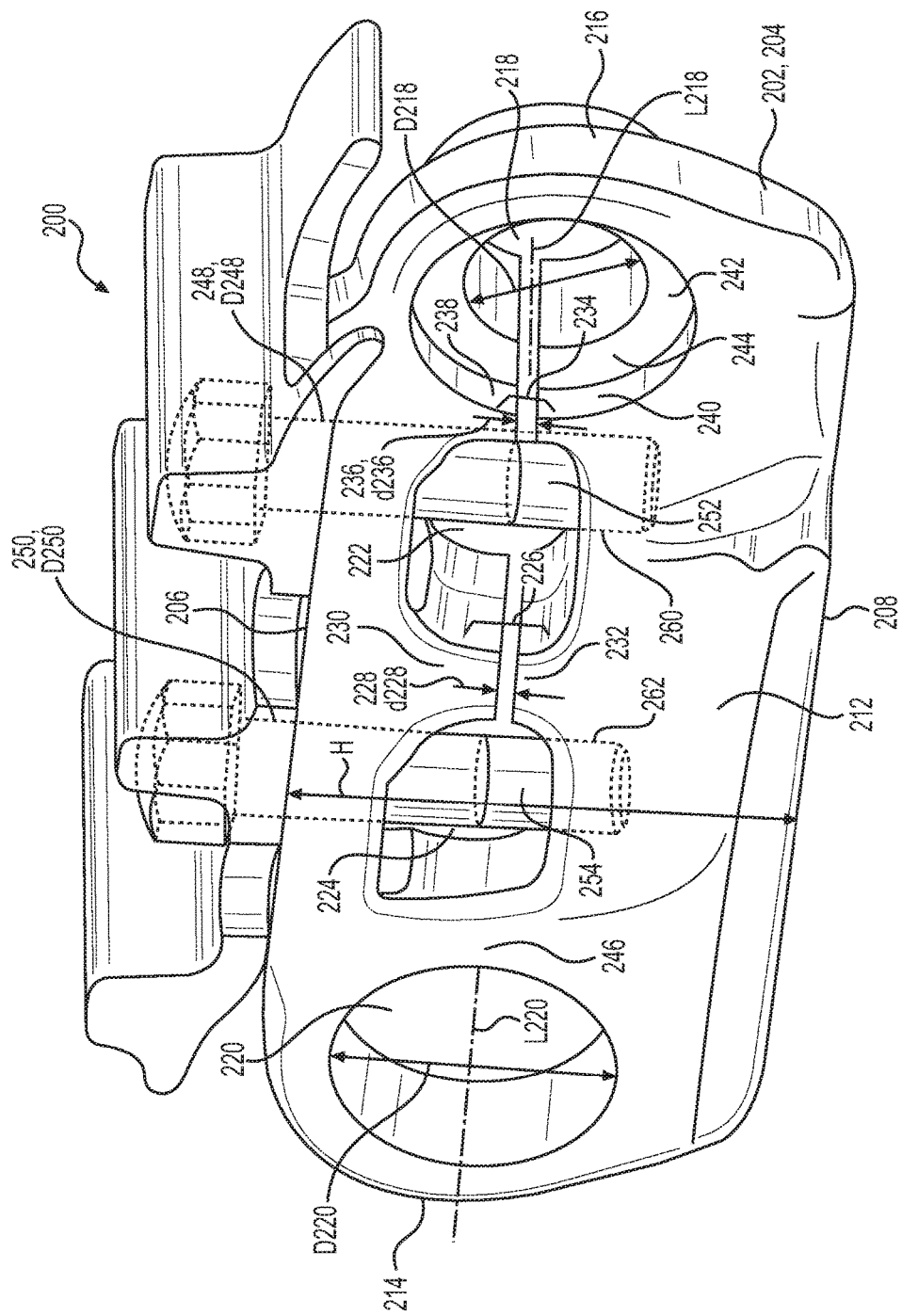
FIG. 5 is a rear oriented perspective view of the exemplary clamping master track link subassembly of FIG. 4.

For the embodiments shown in FIGS. 4 and 5, the first bore 218 defines a first diameter D218 and the second bore 220 defines a second diameter D220. The first diameter D218, being configured to mate with a pin 126, is less than the second diameter D220, which configured to mate with a bushing 124. The second bore 220 is a thru bore, extending completely through the body 204 of the link while and the first bore 218 is a blind bore forming a bottom annular surface 242 as best seen in FIG. 5. A third bore 244 extends from the bottom annular surface 242 completely through the body 204 of the clamping master track link member. During assembly of the track chain assembly 112, which usually occurs at the manufacturer, the stand offset link members 118 are assembled as previously described above with respect to FIGS. 2 and 3.

When the desired length of the chain assembly has been achieved, the distal end 216 of a pair of opposing master track link members are attached to pair of opposing free ends of the chain where the bushing 124 is pressed into second bore 220. The bridge 246 provides the needed rigidity so that the pressing operation generates a suitable amount of retention force, helping to ensure that the master track link 202 does not fall off the chain assembly 112. Then, once the chain assembly 112 has been routed about the drive sprockets 110, idler wheels 106, rollers, etc. of the undercarriage 104, the chain is completed by inserting a pin 126 into the first bore 218 and creating a clamping action holding the proximate end 214 of the master track link 202 onto the pin 214 and a bushing 124 firmly using a fastener as will be described in more detail momentarily.

To that end, the size of the gaps are instrumental in allowing this clamping action to take place in a suitable manner. Consequently, the first gap 228 defines a first minimum distance d228 and the second gap 236 defines a second minimum distance d236 and the ratio of the second minimum distance d236 to the first minimum distance d228 may range from 3 to 10. In some instances, this ratio may range from 6 to 7. Exemplary values of the first minimum distance d228 versus the second minimum distance d236 are 0.75 mm to 5 mm respectively. The value of this ratio or the distances may be varied as needed or desired in other embodiments.

The necessary flexibility may also be expressed in terms of a ratio of the height H of the body 204, which is the minimum distance from the top surface 206 to the bottom surface 208, to the first minimum distance d228. This ratio may range from 100 to 150. In particular embodiments, this ratio may range from 130 to 140. Exemplary values of the height H may range from 90-130 mm.

For the embodiments in FIGS. 4 thru 7, the body 204 may further define a first cross-hole 248 extending in a direction perpendicular to the first longitudinal axis L218 of the first bore 218 from the top surface 206 to the first aperture 222 and a second cross-hole 250 extending in a direction perpendicular to the second longitudinal axis L220 of the second bore 220 from the top surface 206 to the second aperture 224. The first cross-hole 248 may define a first diameter D248 and the second cross-hole 250 may define a second diameter D250. In some embodiments, the first diameter D248 is greater than the second diameter D250, allowing a larger fastener to be used near the first bore 218 than the fastener used near the second bore 220. This may allow the force generated near the first bore 218 to be greater where clamping force is most needed to impinge upon the pin 126.

Figure 6:
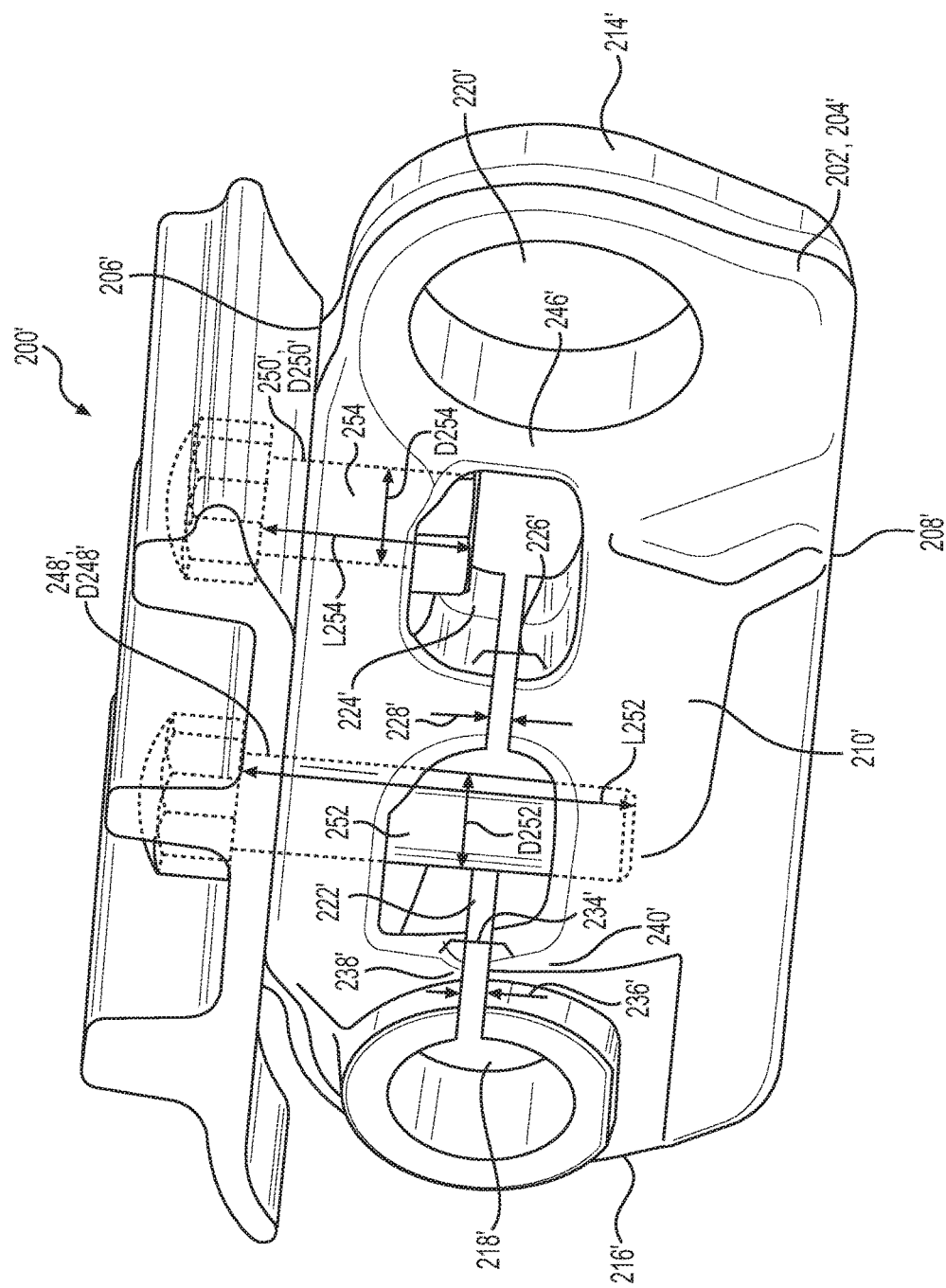
FIG. 6 is a front oriented perspective view of an exemplary clamping master track link subassembly using fasteners having different dimensions from each other used to attach a shoe to the clamping master track link and to provide the necessary clamping action to attach the clamping master track link to a track chain assembly.
Figure 7:
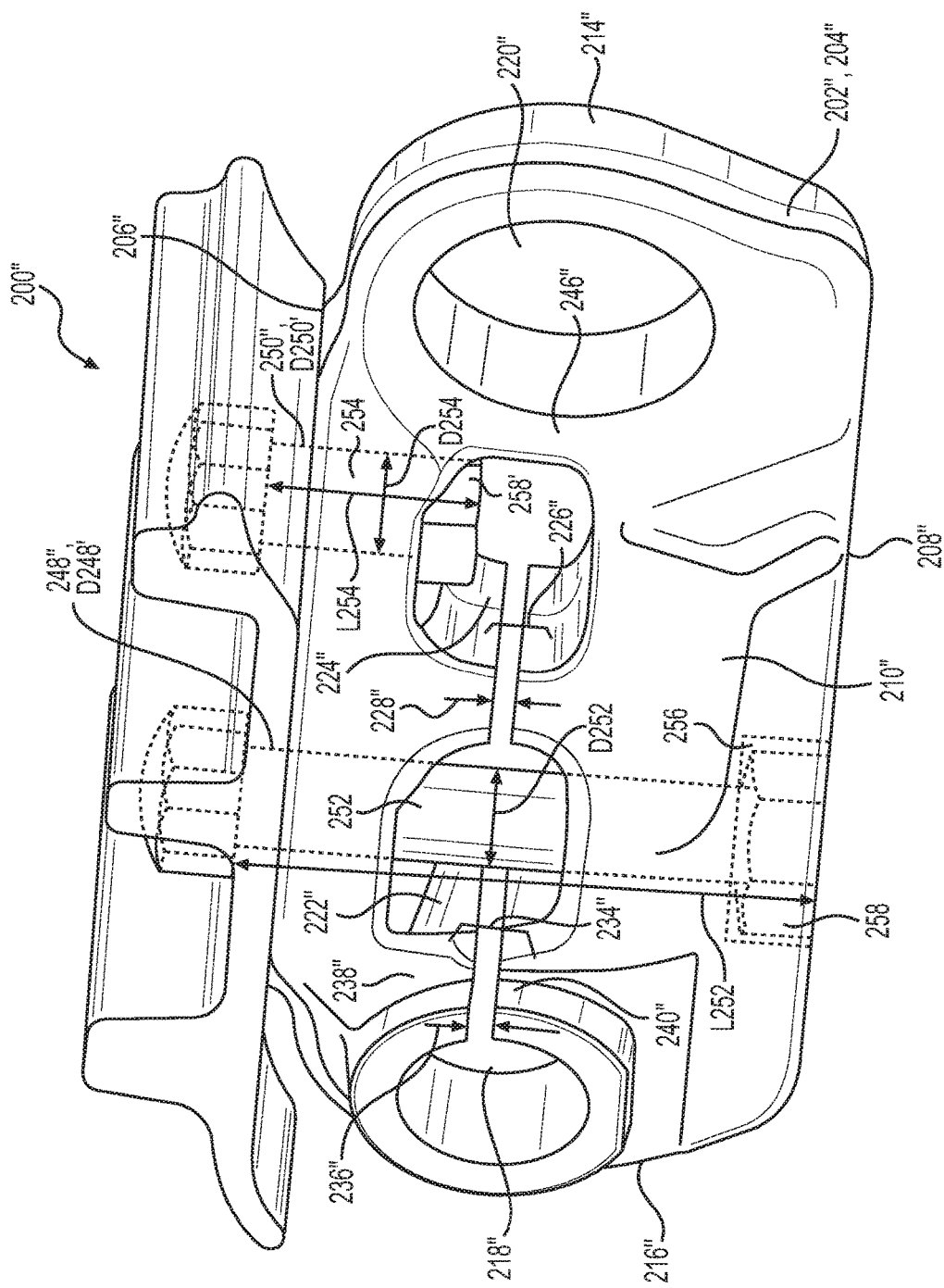
FIG. 7 is a front oriented perspective view of an exemplary clamping master track link that uses pockets with nuts therein for receiving the fastener used to attach a shoe to the clamping master track link and to provide the necessary clamping action to attach the clamping master track link to a track chain assembly.

In a more general sense, as best understood by referring to FIGS. 6 and 7, various embodiments of the present disclosure include a first master track link fastener 252 disposed in the first cross-hole 248, which is a clearance hole, and a second master track link fastener 254 disposed in the second-cross-hole 250, which is also a clearance hole. In some cases, the first master track link fastener 252 and the second master track link fastener 254 may define different dimensions from each other. In other words, the first and second master track link fasteners may be differently configured one from another.

For example, the first master track link fastener 252 may define a first length L252 and the second master track link fastener 254 may defines a second length L254 that is less than the first length L252. The first master track link fastener 252, which is nearest the first bore 218 may be longer than the second master track link fastener 254 in order to provide most or all the necessary clamping force on the pin 126. Alternatively, as just alluded to above, the first master track link fastener 252 may define a first diameter D252 and the second master track link fastener 254 may define a second diameter D254 that is smaller than the first diameter D252. This too may allow the first master track link fastener to provide more clamping force than the second master track link fastener. Other dimensional variances or combinations of dimensional variances are possible.

As best seen in FIG. 7, the first cross-hole 248 extends from the top surface 206 to the bottom surface 208 and the bottoms surface 208 defines a notch or a pocket 256 in communication with the first cross-hole 248 and proximate the first master track link fastener 252. A nut 258 may be disposed in the pocket 256 so that the fastener simply needs to be rotated to be tightened. Similar structure may be provided for the second master track link fastener if needed or desired. In many instances, it is desirable for the nut to be flush to recessed compared to the bottom surface so that the nut does not hinder the function of the bottom surface as a support surface.

On the other hand, as best seen in FIGS. 4 and 5, the body 204 of the master track link 202 may define a first threaded hole 260 in communication with the first aperture 222 and aligned with the first cross-hole 248. The first threaded hole 260 may also be disposed between the first aperture 222 and the bottom surface 208, that is to say, it may be a blind hole. A second threaded hole 262 may also be provided so that the threads of the second master track link fastener 254 may engage them. Again, the provision of the threaded holes 260, 262 the needed clamping action to be provided by simply rotating the fasteners 252, 254 without needing to hold a nut stationary. This may ease assembly. It is contemplated that the threaded holes may be thru holes in other embodiments. Also, any of these threaded holes may be at least partially defined by hardened material that forms the rail portions of the links, providing suitable support for the weight of the machine and its payload.

INDUSTRIAL APPLICABILITY

In practice, a master track link, a pair of master track links, a chain using a master track link or a pair of track links, or a pair of master track link subassemblies according to any embodiment described herein may be sold, bought, manufactured or otherwise obtained in an OEM or aftermarket context.

A master track link 202 or master track link subassembly 200 may be attached to the free end of a chain assembly 112 at the factory and sold as a replacement part or already installed on a machine such as shown and described previously with respect to FIG. 1. Completing the chain assembly 112 simply requires the user to align the free end of the clamping master track link 202 to the free end of the adjacent standard track link 118 (see step 300 in FIG. 8), which already as has a bushing 124 installed via a press fit or by using some other suitable method. Then, the pin 126 would be inserted through the bushing 124 and be aligned with the first bore 218 of the opposing master track links 202 (see step 302 in FIG. 9). Tightening one or more master track link fasteners 252, 254 while attaching the shoe 114 would cause the link 202 to impinge on the pin 126, holding onto it firmly, completing the chain assembly 112 (see steps 304 and 306 in FIG. 4).

The chain assembly 112 as a whole may be described as follows in reference to FIGS. 1-9. The track chain assembly 112 may comprise a plurality of track pins 126 and track bushings 124 disposed about the track pins 126, and a plurality of track links 118 that are connected to each other by either a track pin 126 or a track bushing 124, wherein at least one track link 118 defines a plurality of apertures 128, 132 for receiving a track pin 126 or bushing 124. The chain assembly 112 would typically also include a plurality of track fasteners 150 and a plurality of track shoes 114 attached to the track links 118 via the track fasteners 150. Finally, at least one and typically two opposing clamping master track links 202 are attached at one free end of the track chain assembly 112.

The master track link 202 may include a body 204 defining a top surface 206, a bottom surface 208, a first side surface 210 and a second side surface 212 defining a thickness therebetween, a proximate end 214 and a distal end 216. The body 204 may also define a first bore 218 adjacent the distal end 216 and a second bore 220 adjacent to the proximate end 214. A first aperture 222 may be disposed between the first bore 218 and the second bore 220, the first aperture 222 being disposed nearer the first bore 218 than the second bore 220. A second aperture 224 may be disposed between the first aperture 222 and the second bore 220.

As a result of this structure, the body 204 includes a first strut 226 disposed between the first aperture 222 and the second aperture 224 and defines a first gap 228 dividing the first strut 226 into a first upper portion 230 and a first lower portion 232. The body 204 also includes a second strut 234 disposed between the first aperture 222 and the first bore 218 and defines a second gap 236 dividing the second strut 234 into a second upper portion 238 and a second lower portion 240.

The first bore 218 defines a first longitudinal axis L218 and the second bore 220 defines a second longitudinal axis L220 and the body 204 jogs, forming an offset master track link 202 such that the first bore 218 and second bore 220 are offset from each other along either the first or second longitudinal axis L218, L220. The first bore 218 defines a first diameter D218, the second bore 220 defines a second diameter D220, the first diameter D218 is less than the second diameter D220, the first bore 218 is a thru bore and the second bore 220 is a blind bore. The body includes a bridge 246 disposed between the second aperture 224 and the second bore 220. This structure allows the bushing 124 to be press fit into the second bore 220 while the pin 126 may slide into the first bore 218. Then, fasteners 252, 254 may be used to attach a shoe 114 to the master track link 202, causing the link 202 to impinge upon and hold the pin 126.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A clamping master track link comprising:
    a body defining a top surface, a bottom surface, a first side surface and a second side surface defining a thickness therebetween, a proximate end and a distal end; wherein
    the body defines a first bore adjacent the distal end and a second bore adjacent to the proximate end;
    the body defines a first aperture disposed between the first bore and the second bore, the first aperture being disposed nearer the first bore than the second bore;
    the body defines a second aperture disposed between the first aperture and the second bore;
    the body includes a first strut disposed between the first aperture and the second aperture, the body defining a first gap dividing the first strut into a first upper portion and a first lower portion;
    the body includes a second strut disposed between the first aperture and the first bore, the body defining a second gap dividing the second strut into a second upper portion and a second lower portion; and
    the body includes a bridge disposed between the second aperture and the second bore, wherein the first bore defines a first diameter, the second bore defines a second diameter, the first diameter is less than the second diameter, the first bore is a blind bore and the second bore is a thru bore.

2. The clamping master track link of claim 1 wherein the first bore defines a first longitudinal axis and the second bore defines a second longitudinal axis and the body jogs, forming an offset master track link such that the first bore and second bore are offset from each other along either the first or second longitudinal axis.

3. The clamping master track link of claim 2 wherein the body further defines a first cross-hole extending in a direction perpendicular to the first longitudinal axis of the first bore from the top surface to the first aperture and a second cross-hole extending in a direction perpendicular to the second longitudinal axis of the second bore from the top surface to the second aperture, wherein the first cross-hole defines a first diameter and the second cross-hole defines a second diameter, and the first diameter is greater than the second diameter.

4. The clamping master track link of claim 1 wherein the first gap defines a first minimum distance and the second gap defines a second minimum distance and the ratio of the second minimum distance to the first minimum distance ranges from 3 to 10.

5. The clamping master track link of claim 4 wherein the ratio of the second minimum distance to the first minimum distance ranges from 6 to 7.

6. The clamping master track link of claim 4 wherein the body defines a height from the top surface to the bottom surface, and a ratio of the height to the first minimum distance ranges from 100 to 150.

7. The clamping master track link of claim 6 wherein the ratio of the height to the first minimum distance ranges from 130 to 140.

8. A clamping master track link comprising:
a body defining a top surface, a bottom surface, a first side surface and a second side surface defining a thickness therebetween, a proximate end and a distal end; wherein
the body defines a first bore adjacent the distal end and a second bore adjacent to the proximate end;
the body defines a first aperture disposed between the first bore and the second bore, the first aperture being disposed nearer the first bore than the second bore;
the body defines a second aperture disposed between the first aperture and the second bore;
the body includes a first strut disposed between the first aperture and the second aperture, the body defining a first gap dividing the first strut into a first upper portion and a first lower portion;
the body includes a second strut disposed between the first aperture and the first bore, the body defining a second gap dividing the second strut into a second upper portion and a second lower portion; and
the first gap defines a first minimum distance and the second gap defines a second minimum distance and the ratio of the second minimum distance to the first minimum distance ranges from 3 to 10, wherein the body includes a bridge disposed between the second aperture and the second bore, wherein the first bore defines a first longitudinal axis and the second bore defines a second longitudinal axis and the body jogs, forming an offset master track link such that the first bore and second bore are offset from each other along either the first or second longitudinal axis, and wherein the body further defines a first cross-hole extending in a direction perpendicular to the first longitudinal axis of the first bore from the top surface to the first aperture and a second cross-hole extending in a direction perpendicular to the second longitudinal axis of the second bore from the top surface to the second aperture, wherein the first cross-hole defines a first diameter and the second cross-hole defines a second diameter, and the first diameter is greater than the second diameter.

9. The clamping master track link of claim 8 wherein the ratio of the second minimum distance to the first minimum distance ranges from 6 to 7.

10. The clamping master track link of claim 8 wherein the body defines a height from the top surface to the bottom surface, and a ratio of the height to the first minimum distance ranges from 100 to 150.

11. The clamping master track link of claim 10 wherein the ratio of the height to the first minimum distance ranges from 130 to 140.

12. The clamping master track link of claim 8 wherein the first bore defines a first diameter, the second bore defines a second diameter, the first diameter is less than the second diameter, the first bore is a blind bore and the second bore is a thru bore.

13. A track chain assembly comprising:
a plurality of track pins and track bushings disposed about the track pins; and
a plurality of track links that are connected to each other by either a track pin or a track bushing, wherein at least one track link defines a plurality of apertures for receiving a track pin or bushing;
a plurality of track fasteners;
a plurality of track shoes attached to the track links via the track fasteners; and
at least one clamping master track link including
a body defining a top surface, a bottom surface, a first side surface and a second side surface defining a thickness therebetween, a proximate end and a distal end; wherein
the body defines a first bore adjacent the distal end and a second bore adjacent to the proximate end;
the body defines a first aperture disposed between the first bore and the second bore, the first aperture being disposed nearer the first bore than the second bore;
the body defines a second aperture disposed between the first aperture and the second bore;
the body includes a first strut disposed between the first aperture and the second aperture, the body defining a first gap dividing the first strut into a first upper portion and a first lower portion;
the body includes a second strut disposed between the first aperture and the first bore, the body defining a second gap dividing the second strut into a second upper portion and a second lower portion;
the first bore defines a first longitudinal axis and the second bore defines a second longitudinal axis and the body jogs, forming an offset master track link such that the first bore and second bore are offset from each other along either the first or second longitudinal axis;
the first bore defines a first diameter, the second bore defines a second diameter, the first diameter is less than the second diameter, the first bore is a blind bore and the second bore is a thru bore;
and the body includes a bridge disposed between the second aperture and the second bore.

14. The track chain assembly of claim 13 wherein the body further defines a first cross-hole extending in a direction perpendicular to the first longitudinal axis of the first bore from the top surface to the first aperture and a second cross-hole extending in a direction perpendicular to the second longitudinal axis of the second bore from the top surface to the second aperture and the track chain assembly further includes a first master track link fastener disposed in the first cross-hole and a second master track link fastener disposed in the second-cross-hole, wherein the first master track link fastener and the second master track link fastener define different dimensions from each other.

15. The track chain assembly of claim 14 wherein the first master track link fastener defines a first length and the second master track link fastener defines a second length that is less than the first length or wherein the first master track link fastener defines a first diameter and the second master track link fastener defines a second diameter that is smaller than the first diameter.

16. The track chain assembly of claim 15 wherein the body defines a first threaded hole in communication with the first aperture and aligned with the first cross-hole, the first threaded hole also being disposed between the first aperture and the bottom surface.

* * * * *